(12) United States Patent
Komoda et al.

(10) Patent No.: US 10,464,650 B2
(45) Date of Patent: Nov. 5, 2019

(54) MARINE ENGINE PROPELLING APPARATUSES

(71) Applicants: KABUSHIKI KAISHA TOYOTA JIDOSHOKKI, Aichi (JP); TOYOTA JIDOSHA KABUSHIKI KAISHA, Aichi (JP)

(72) Inventors: Masahiro Komoda, Aichi-ken (JP); Yoshimitsu Sugiura, Aichi-ken (JP); Yushiro Isobe, Aichi-ken (JP)

(73) Assignees: KABUSHIKI KAISHA TOYOTA JIDOSHOKKI, Aichi-Ken (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 302 days.

(21) Appl. No.: 15/304,270

(22) PCT Filed: Apr. 3, 2015

(86) PCT No.: PCT/JP2015/060583
§ 371 (c)(1),
(2) Date: Oct. 14, 2016

(87) PCT Pub. No.: WO2015/159734
PCT Pub. Date: Oct. 22, 2015

(65) Prior Publication Data
US 2017/0043853 A1    Feb. 16, 2017

(30) Foreign Application Priority Data
Apr. 17, 2014    (JP) .................................. 2014-085482

(51) Int. Cl.
*B63H 20/14*    (2006.01)
*B63H 25/06*    (2006.01)
(Continued)

(52) U.S. Cl.
CPC ............. *B63H 20/14* (2013.01); *B63H 20/06* (2013.01); *B63H 20/10* (2013.01); *B63H 20/22* (2013.01);
(Continued)

(58) Field of Classification Search
CPC ........ B63H 20/14; B63H 20/22; B63H 20/10; B63H 23/34; B63H 25/06; B63H 20/28;
(Continued)

(56) References Cited

U.S. PATENT DOCUMENTS 4,371,348 A    2/1983    Blanchard
4,382,796 A    5/1983    Blanchard
(Continued)

FOREIGN PATENT DOCUMENTS

JP    56-163994    12/1981
JP    57-172896    10/1982
(Continued)

OTHER PUBLICATIONS

International Search Report for international Patent Application No. PCT/JP2015/060583, dated Jun. 23, 2015, along with English-language translation thereof.

*Primary Examiner* — Christian Chace
*Assistant Examiner* — Jordan S Fei
(74) *Attorney, Agent, or Firm* — Greenblum & Bernstein, P.L.C.

(57) ABSTRACT

An engine propelling apparatus has power generating transmitting portion provided below a power generating portion, a propelling force generating portion provided adjacent to the power transmitting portion, and height adjustment mechanisms. The power generating portion includes an engine with a crankshaft arranged horizontal and substantially parallel to the front-rear longitudinal direction of a boat. A power transmission mechanism forms a linear power (Continued)

transmission route extending from the vicinity of a front end of the crankshaft to the vicinity of a front end of the propelling force generating portion. The propelling force generating portion includes a propeller shaft extending rearwards from the power transmitting portion, and a propeller at a rear portion of the propeller shaft. The height adjustment mechanisms vary inclination or height of all or a part of the engine propelling apparatus with respect to the boat to thereby vary height of the propeller with respect to the boat.

17 Claims, 8 Drawing Sheets

(51) Int. Cl.

| | | |
|---|---|---|
| *B63H 25/42* | (2006.01) | |
| *B63H 20/06* | (2006.01) | |
| *B63H 20/28* | (2006.01) | |
| *B63H 20/10* | (2006.01) | |
| *B63H 23/34* | (2006.01) | |
| *B63H 20/22* | (2006.01) | |
| *B63J 99/00* | (2009.01) | |
| *B63H 1/18* | (2006.01) | |

(52) U.S. Cl.
CPC ............ *B63H 20/28* (2013.01); *B63H 23/34* (2013.01); *B63H 25/06* (2013.01); *B63H 25/42* (2013.01); *B63H 2001/185* (2013.01); *B63J 2099/006* (2013.01)

(58) Field of Classification Search
CPC .. B63H 20/06; B63H 25/42; B63H 2001/185; B63J 2099/006
See application file for complete search history.

(56) References Cited

U.S. PATENT DOCUMENTS

| | | | |
|---|---|---|---|
| 4,382,797 A | 5/1983 | Blanchard | |
| 4,408,994 A | 10/1983 | Blanchard | |
| 4,541,817 A | 9/1985 | Sawabe et al. | |
| 4,559,018 A * | 12/1985 | Nakahama | B63H 20/14 |
| | | | 248/642 |
| 4,645,463 A | 2/1987 | Arneson | |
| 7,438,013 B2 | 10/2008 | Mizutani | |
| 8,460,041 B2 | 6/2013 | Davis et al. | |
| 2004/0014376 A1* | 1/2004 | Noyes | B63B 1/22 |
| | | | 440/66 |
| 2005/0287882 A1* | 12/2005 | Muller | B63H 20/08 |
| | | | 440/53 |
| 2007/0068438 A1 | 3/2007 | Mizutani | |
| 2010/0216358 A1 | 8/2010 | Blomdahl | |
| 2011/0143608 A1* | 6/2011 | Chiecchi | B63B 39/061 |
| | | | 440/53 |
| 2011/0263165 A1* | 10/2011 | Rolla | B63H 5/1252 |
| | | | 440/6 |
| 2012/0094558 A1 | 4/2012 | Takase et al. | |
| 2014/0179179 A1 | 6/2014 | Blomdahl | |

FOREIGN PATENT DOCUMENTS

| | | |
|---|---|---|
| JP | 59-6196 | 1/1984 |
| JP | 3-31092 | 2/1991 |
| JP | 2007-91115 | 4/2007 |
| JP | 2007-290644 | 11/2007 |
| JP | 2010-173447 | 8/2010 |
| JP | 2012-81899 | 4/2012 |
| JP | 2013-519574 | 5/2013 |
| JP | 2013-525198 | 6/2013 |
| WO | 2011/100641 | 8/2011 |

\* cited by examiner

MARINE ENGINE PROPELLING APPARATUSES

CROSS-REFERENCE TO RELATED APPLICATIONS

The present application is a National Phase entry of, and claims priority to, PCT Application No. PCT/JP2015/060583, filed Apr. 3, 2015, which claims priority to Japanese Patent Application No. 2014-085482, filed Apr. 17, 2014, both of which are incorporated herein by reference in their entireties for all purposes.

BACKGROUND

The present invention relates to a marine engine propelling apparatus which is mounted, for example, to an outboard portion at a rear end of a boat.

A marine engine propelling apparatus is mounted to an exterior portion at a rear end of a boat used, for example, for fishing or cruising. There exist a variety of engine propelling apparatuses according to the size of the boat or the height of the rear end of the boat as measured from the water surface, etc.

Japanese Laid-Open Patent Publication 2013-519574 discloses a large marine outboard motor. The large marine outboard motor 110, as shown in FIG. 15, is equipped with an engine 111, a first transmission 112A, a second transmission 112B, a third transmission 112C, a propeller shaft 122, and a propeller 127. A plurality of power transmission routes D100 to D104 exist between the engine 111 and the propeller 127. In the power transmission route D100, power is transmitted substantially in the horizontal direction, which is the direction of the rotation axis of the crankshaft 111C of the engine 111. In the power transmission route D101, power is transmitted substantially in the vertical direction from the rear end of the engine 111 the end facing away from the boat in FIG. 15 to the second transmission 112B through the first transmission 112A. In the power transmission route D102, power is transmitted substantially in the horizontal direction. In the power transmission route D103, power is transmitted substantially in the vertical direction from the second transmission 112B to the third transmission 112C. In the power transmission route D104, power is transmitted substantially in the horizontal direction from the third transmission 112C through the propeller shaft 122, i.e., in the direction of the rotation axis of the propeller shaft 122. Thus, the power transmission routes are configured to form an S-shaped route. The motor 110 is mounted to the rear end of the boat 1 via a right-left steering means 132 for swinging the position of the motor 110 to the right or left with respect to the longitudinal axis of the boat 1.

BRIEF SUMMARY

Because the motor 110 includes a large number of components for each power transmission route (from the first transmission 112A through the third transmission 112C), it is not easy to make the motor small or lightweight. In addition to the large number of components, the motor has a complex S-shaped power transmission route. This causes an increased risk of loss of power.

The conventional marine engine propelling apparatus including the motor 110 is manufactured in a variety of heights of the height measurement portion MH as shown in FIG. 15 because MH depends on the height of the boat as measured from the water surface, at the rear end of the boat to which the apparatus is mounted. This height variation complicates the production or manufacturing management of the engine propelling apparatus, and may further prevent a reduction in the size or weight of the engine propelling apparatus.

Thus, there has been a need for a marine engine propelling apparatus which can transmit power efficiently due to simplicity in its structure and which is small or lightweight.

According to an aspect of the present invention, there is provided a marine engine propelling apparatus which is mounted to an outboard portion at a rear end of a boat. The engine propelling apparatus has a power generating portion, a power transmitting portion provided below the power generating portion, a propelling force generating portion provided below the power transmitting portion, and a height adjustment mechanism. The power generating portion includes an engine equipped with a crankshaft, where the crankshaft is arranged substantially parallel to a front-rear direction of the boat and is substantially horizontal. The power transmitting portion has a power transmission mechanism forming a linear power transmission route extending from the vicinity of a front end of the crankshaft to the vicinity of a front end of the propelling force generating portion. The propelling force generating portion includes a propeller shaft extending rearwards from the power transmitting portion, and a propeller provided at a rear portion of the propeller shaft. The height adjustment mechanism is configured to vary inclination or height of all or a part of the engine propelling apparatus with respect to the boat to thereby vary height of the propeller with respect to the boat.

The power transmission route from the power generating portion to the propeller is formed in a substantially U-shaped configuration by the crankshaft, the power transmission mechanism, and the propeller shaft. Thus, the engine propelling apparatus may be formed in a simpler construction as compared to the conventional engine propelling apparatus where the power transmission route is S-shaped. As a result, the loss in power transmission may be reduced by the instant configuration, making it possible to transmit power more efficiently. In addition, the number of components of the engine propelling apparatus may be reduced, making it possible to reduce the size or the weight of the engine propelling apparatus. The height adjustment mechanism may adjust the height of the propeller concomitantly while the engine propelling apparatus is mounted to the boat. Thus, there is no need to prepare separate engine propelling apparatuses of different heights for various corresponding boats differing in height as measured from the water surface.

According to another aspect of the present invention, the propeller shaft may have a first portion extending from the power transmitting portion so as to be substantially parallel to the front-rear direction of the boat and extending substantially horizontally, and a second portion connected to a rear end of said first portion by a universal joint that allows angle adjustment. The propelling force generating portion may have a sleeve into which at least a part of said second portion is inserted. The height adjustment mechanism may be a trim angle adjustment mechanism connected to the sleeve which changes the angle in the vertical direction of the second portion along with the sleeve around the universal joint. This trim angle adjustment mechanism to adjust the propeller height may be constructed with a smaller and/or more lightweight construction as compared with the prior art steering adjustment mechanism in which the engine propelling apparatus as a whole is swung with respect to the boat.

According to another aspect of the invention, the engine propelling apparatus can have a boat speed detecting means for detecting the speed of the boat, a boat front-rear inclination detecting means for detecting the inclination angle of a front-rear direction line of the boat with respect to the horizon, and an associated controller. The controller estimates a boat water surface position, which is the position of the water surface with respect to the boat, from the inclination angle of the boat front-rear direction line detected based on a detection signal from the boat front-rear inclination detecting means, and at least one of the speed or acceleration of the boat detected based on a detection signal from the boat speed detecting means. The controller determines whether to attain an immersed state in which the whole propeller is submerged below the boat water surface position or to attain a half-immersed state in which an upper portion of the propeller is above the boat water surface position. The controller makes this determination based on the boat water surface position and at least one of the speed or acceleration of the boat detected. In the case where the controller determines that the immersed state is to be attained, the controller controls the height adjustment mechanism such that the whole propeller can be submerged below the boat water surface position. In the case where the controller determines that the half-immersed state is to be attained, the controller controls the height adjustment mechanism so that the upper portion of the propeller can remain above the boat water surface position.

When, for example, the controller gets a request for acceleration from the user, the controller may control the propeller position to attain the immersed state due to acceleration being of greater importance than fuel efficiency. Conversely, when the boat is to cruise at high speed, the controller may control the propeller position to attain the half-immersed state where fuel efficiency is of greater importance than acceleration.

According to another aspect of the invention, the height adjustment mechanism may be a lift position adjustment mechanism provided between the boat and the engine propelling apparatus, where said mechanism is configured to adjust the height of the engine propelling apparatus with respect to the boat. As a result, the mechanic etc., for example, can adjust the engine propelling apparatus to a desired height when the boat is brought onto land for the purpose of maintenance or the like. Thus, the engine propelling apparatus is more accessible and easier to maintain.

According to another aspect of the invention, the engine propelling apparatus may have an engine trim adjustment mechanism. The engine trim adjustment mechanism is provided between the engine propelling apparatus and the boat, and is configured to adjust the inclination angle towards or away from the vertical z-direction of the front-rear direction line of the engine propelling apparatus with respect to the longitudinal axis of the boat. As a result, the mechanic et al., for example, can adjust the engine propelling apparatus at a desired angle when the boat is brought onto land for the purpose of maintenance or the like. Thus, the engine propelling apparatus is even further accessible and easier to maintain.

According to another aspect of the invention, the engine propelling apparatus may have a cooling mechanism. The cooling mechanism is equipped with a cooling route provided in the engine propelling apparatus, and a coolant sealed in the cooling route. The cooling mechanism may cool the engine propelling apparatus through the circulation of the coolant. Thus, the engine is cooled not through direct cooling utilizing seawater but through indirect cooling by the circulation of the coolant. In this manner, the engine can be cooled appropriately because the coolant is of a more stable quality than seawater. Further, the corrosion prevention property of the cooling route, etc. can also be improved where the coolant is used as compared to the case where seawater is used.

According to another aspect of the invention, the engine is a diesel engine. Thus, it is possible to achieve an improvement in terms of fuel efficiency as compared with the case where a gasoline engine is used. In addition, the diesel engine may produce larger torque even at low rotation, and thus is easy to handle even in the case of low rotation.

DETAILED DESCRIPTION

A marine engine propelling apparatus 10, 10A and 10B according to an embodiment of the present invention will be described with reference to the drawings. For purposes of this application, and as used hereinafter, an X-direction is defined as a front direction in which a boat advances where the front-rear direction of the boat lies in and defines the X-axis, a Y-direction is defined as the right direction of the boat where the right-left direction of the boat lies in and defines the Y-axis, and a Z-direction is defined as the vertical and upward direction relative to the longitudinal axis of the boat, where the upward-downward direction of the boat lies in and defines the Z-axis. The right-left direction mentioned below is determined relative to the direction in which the boat advances, or relative to the state of the boat as seen from behind, wherein the direction in which the boat advances and from which it can be seen from behind is along the X-axis.

Figure 1:
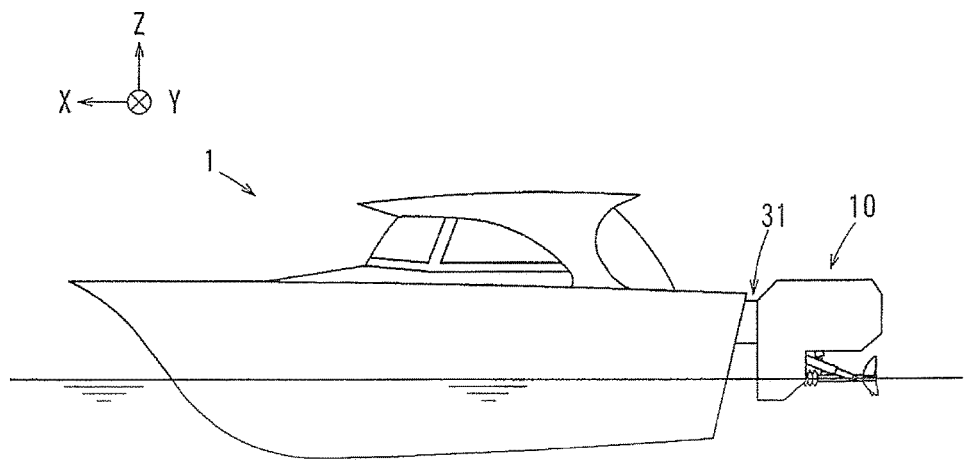
FIG. 1 is a side view of a boat and a marine engine propelling apparatus which is mounted to an outboard portion at a rear end of the boat.

As shown in FIG. 1, an engine propelling apparatus 10 is mounted to an outboard portion at the rear of a boat 1. The engine propelling apparatus 10 is mounted to the boat 1 via a lift position adjustment mechanism (means) 31 that can adjust the height of the engine propelling apparatus 10 with respect to the boat 1. The engine propelling apparatus 10 may be mounted to the boat 1 without the lift position adjustment mechanism 31.

Figure 2:
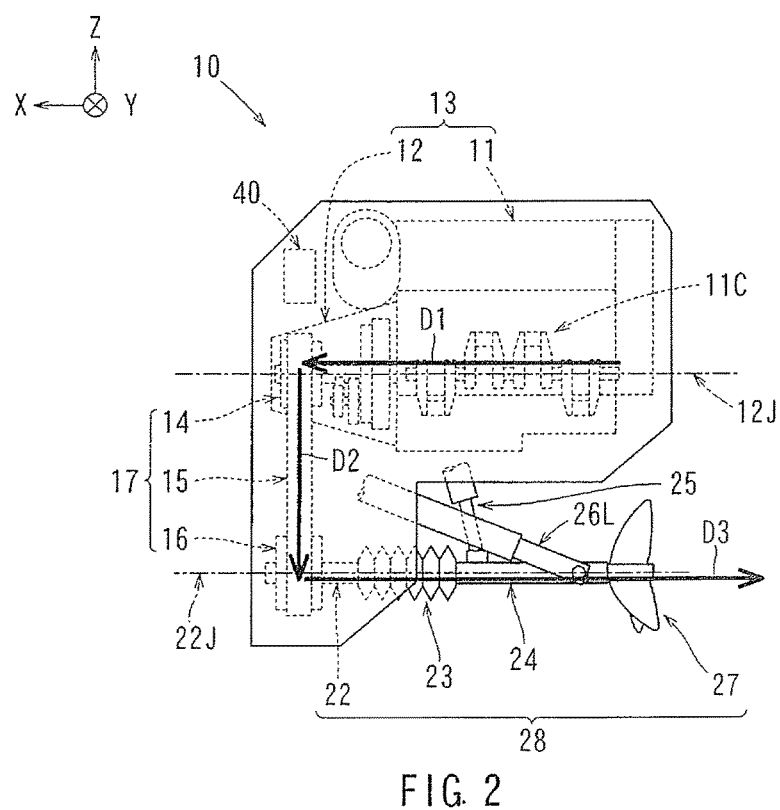
FIG. 2 is a side view illustrating an appearance, general constitution and power transmitting route of the marine engine propelling apparatus.

As shown in FIG. 2, the engine propelling apparatus 10 has a power generating portion 13, a power transmitting portion 17 positioned below the power generating portion 13, and a propelling force generating portion 28 positioned below the power transmitting portion 17.

The power generating portion 13 may include an engine 11 and a transmission 12. The engine 11 is a diesel engine, for example, that may be a converted diesel engine from land use to marine use. The engine 11 has a crankshaft 11C. The crankshaft 11C is arranged substantially parallel to the front-rear direction of the boat 1 parallel to the X-axis in a substantially horizontal configuration. Thus, the engine 11 of the instant invention can be realized through a minor change from an engine for land use with a proven track record in vehicles, etc. Thus, the development period for the engine 11 can be reduced and the reliability of the engine 11 can be secured. If a diesel engine is adopted as the engine 11, fuel efficiency is also improved as compared with a gasoline engine. Additionally, the diesel engine can obtain larger torque at low rotation as compared with a gasoline engine, making the engine easier to handle at the time of low rotation.

The engine 11 has a cooling route, with a coolant sealed in the route, as a cooling mechanism. That is, the engine 11 is cooled indirectly through the circulation of the coolant within the engine 11. Thus, the engine 11 is cooled not by the seawater around but by a previously provided coolant. For example, the cooling mechanism may be inherently equipped with the diesel engine for land use, which may then be used as the cooling mechanism in the instant invention. This may simplify and enhance corrosion prevention of the engine against the seawater (salt water), and may reduce the development time for the engine as well as secure the reliability thereof.

As shown in FIG. 2, the transmission 12 is mounted to a front portion of the power generating portion 13. The transmission 12 is attached at a front end of the engine 11 to be connected to the crankshaft 11C. The transmission 12 is switched between an advancement position, a neutral position, and a retreat position through operation by the user, for example, of a lever connected to the transmission 12. In the advancement position, the transmission 12 transmits the power from the engine 11 so as to rotate a propeller 27 to cause the boat 1 to advance. In the neutral position, the transmission 12 cuts off the power transmission to the propeller 27. In the retreat position, it transmits power so as to rotate to the propeller 27 to cause the boat 1 to retreat. The power is linearly transmitted via the power transmission route D1 from the crankshaft 11C to the output shaft of the transmission 12. The rotation shaft of the crankshaft 11C and the output shaft of the transmission 12 rotate around a rotation axis 12J.

As shown in FIG. 2, the power transmitting portion 17 has, for example, a driving pulley 14, a belt 15, and a driven pulley 16. The driving pulley 14 is mounted to the output shaft of the transmission 12, and is situated in the vicinity of the front end portion of the crankshaft 11C. The driven pulley 16 is mounted to the front end portion of a propeller shaft 22. The belt 15 is stretched between the driving pulley 14 and the driven pulley 16, and transmits the rotational power from the driving pulley 14 to the driven pulley 16. The power transmitting portion 17 forms a power transmission route D2 extending linearly from the vicinity of the front end portion of the crankshaft 11C and the front end portion of the output shaft of the transmission 12 to the vicinity of the front end portion of the propeller shaft 22.

As shown in FIG. 2, the propelling force generating portion 28 has a propeller shaft 22, a universal joint 23, a sleeve 24, and a propeller 27. The propeller shaft 22 is arranged substantially parallel to the front-rear direction of the boat 1, and in a substantially horizontal configuration. More specifically, the propeller shaft 22 has a first portion extending substantially parallel to the front-rear direction of the boat 1 i.e. parallel to the X-axis from the lower terminal portion of the power transmitting portion 17 and arranged substantially horizontally, and a second portion connected to the rear of the first portion where the rear is in the opposite direction of the X-direction, by a universal joint 23. The propeller 27 is provided at the rear end of the second portion of the propeller Shaft 22. The driven pulley 16 is provided at the front end of the first portion of the propeller shaft 22.

As shown in FIG. 2, the propelling force generating portion 28 transmits power from the driven pulley 16 to the propeller 27. The propeller shaft 22 is elongated, and the universal joint 23 is provided at some intermediate region between the first and second portions of the propeller shaft 22. The universal joint 23 is situated between the driven pulley 16 and the propeller 27, and can thus change the power transmitting direction. The first portion, which is situated between the driven pulley 16 and the universal joint 23, as well as the driven pulley 16 itself, are rotated around rotation axis 22J. In FIG. 2, the power transmission route D3 extends linearly from the propeller shaft 22 to the propeller 27.

As shown in FIG. 2, the engine propelling apparatus 10 has a power transmission route extending from the power generating portion 13 to the propeller 27. The power route is substantially of a U-shaped configuration that has a power transmission route D1 including the crankshaft 11C, a power transmission route D2 including the power transmitting portion 17, and a power transmission route D3 including the propeller shaft 22. The power route of FIG. 2 is of a simpler structure as compared with the conventional S-shaped power transmission route of the prior art. Thus, the engine propelling apparatus 10 involves little power transmission loss, and can transmit power efficiently. Further, the engine propelling apparatus 10 allows a reduction in the number of components, whereby the engine propelling apparatus 10 is in a smaller and more lightweight form.

Figure 3:
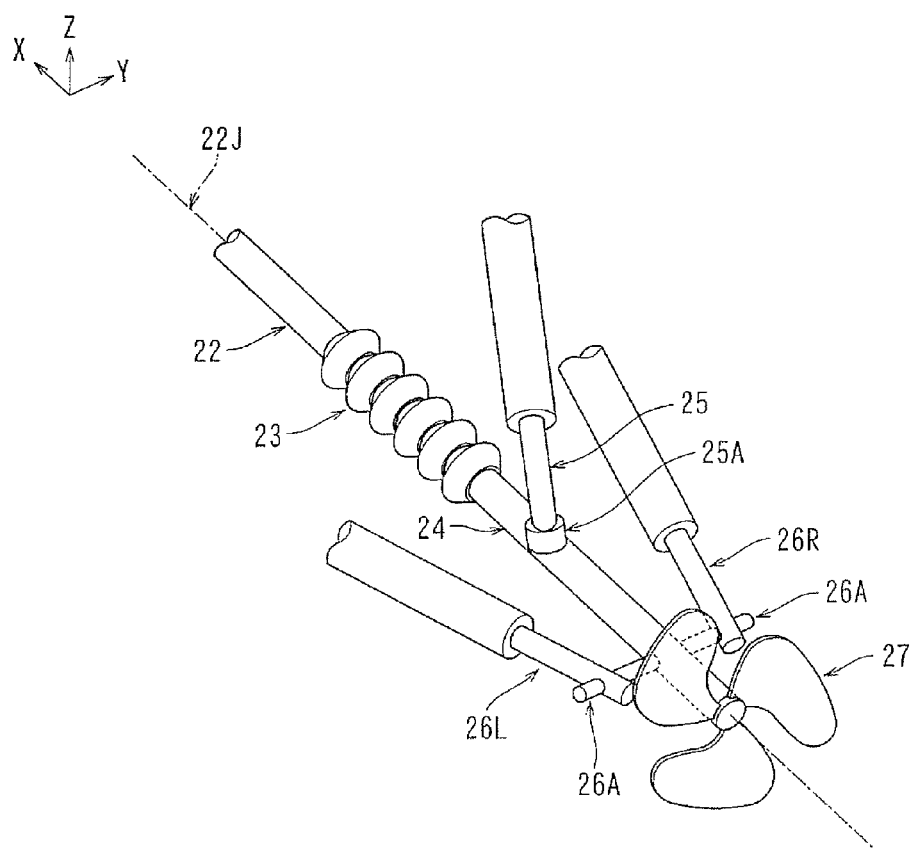
FIG. 3 is a view illustrating a state in which at least one portion of a second portion of a propeller shaft is inserted into a sleeve while a trim angle adjustment mechanism and a steering adjustment mechanisms are connected to each other.

As shown in FIGS. 2 and 3, at least a part of the second portion of the propeller shaft 22 is inserted into a sleeve 24. The sleeve 24 is of a tubular configuration, and covers the second portion of the propeller shaft 22. One end of the trim angle adjustment mechanism (means) 25 is connected to the sleeve 24. The trim angle adjustment mechanism 25 (height adjustment mechanism) has, for example, a cylinder, and a bar connected to a piston provided in the cylinder. An adjustment in length of the trim angle adjustment mechanism 25 is made through adjustment of pressure inside the cylinder. Through the length adjustment, the trim angle adjustment mechanism 25 can change angle of the sleeve 24 around the universal joint 23. As a result, the trim angle adjustment mechanism 25 can adjust the angle of the second portion of the propeller shaft 22 upward/downward along the Z-axis about the universal joint 23.

As shown in FIGS. 2 and 3, respective ends of the right and left steering adjustment mechanisms (means) 26R and 26L are connected to the sleeve 24. To accomplish this, a connection member may be inserted to be substantially orthogonal to the sleeve 24, and the right and left steering adjustment mechanisms 26R and 26L may be connected to each end of the connection member. The steering adjustment mechanisms 26R and 26L have, for example, a cylinder and a bar connected to a piston provided in the cylinder, a length adjustment of the bar being made through adjustment of pressure within the cylinder. Through said length adjustment of their respective bars, the steering adjustment mechanisms 26R and 26L can change the angle of the sleeve 24 about the universal joint 23. As a result, the steering adjustment mechanisms 26R and 26L can adjust the angle of the second portion of the propeller shaft 22 in the right-left direction rightward or leftward along the Y-axis about the universal joint 23.

Figure 9:
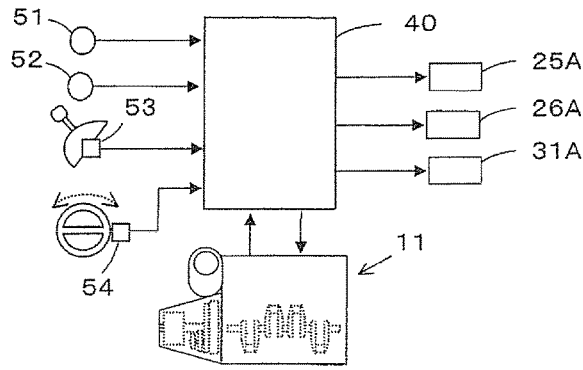
FIG. 9 is a block diagram illustrating signals input into a controller and output from the controller.

As shown in FIG. 9, the engine propelling apparatus 10 has a controller (control means) 40 or a control computer unit. This controller 40 controls the engine 11 of the power generating portion 13, the trim angle adjustment mechanism 25, and the steering adjustment mechanisms 26R and 26L.

Figure 4:
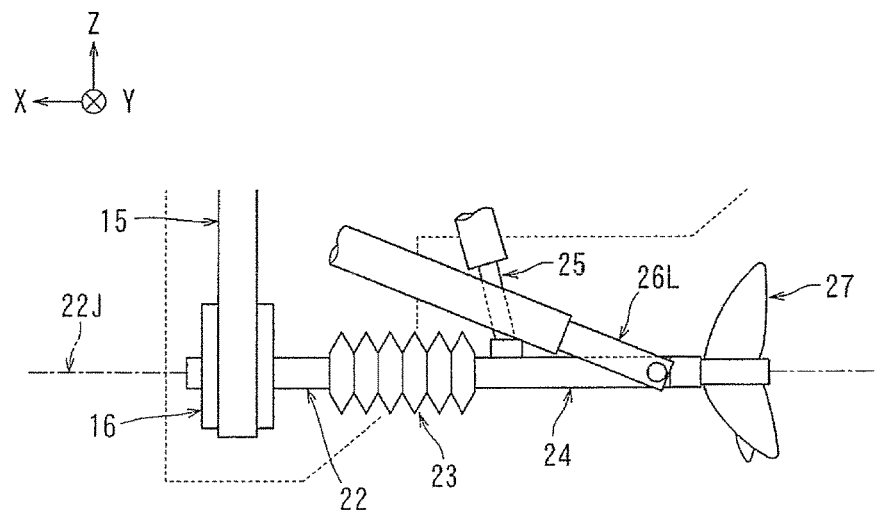
FIG. 4 is a side view illustrating a state in which an angle in a vertical direction of the second portion of the propeller shaft is substantially zero.
Figure 5:
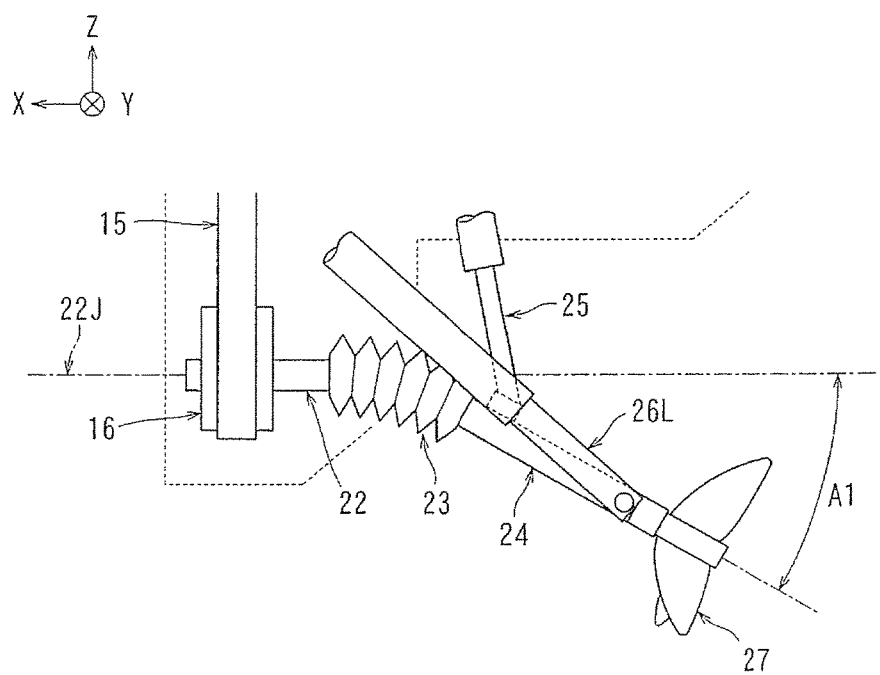
FIG. 5 is a side view illustrating a state in which a downward angle of the second portion of the propeller shaft reaches A1.

As shown in FIGS. 4 and 5, controller 40 is able to control and adjust the length of the trim angle adjustment mechanism 25. As a result, as shown in FIG. 4, the propeller shaft 22 can be set to a position where it is substantially parallel to the X-axis direction and where it is substantially horizontal. Alternatively, as shown in FIG. 5, the second portion of the propeller shaft 22 can be inclined to extend downwards from the universal joint 23 by increasing the length of the trim angle adjustment mechanism 25. As a further alternative, the controller 40 can also control the length of the trim angle adjustment mechanism 25 to be shorter than the length of the trim angle adjustment mechanism 25 as shown in FIG. 4. As a result, the second portion of the propeller shaft 22 may be inclined to extend upwards in the Z-direction from the universal joint 23. In this way, the controller 40 can adjust the angle in the vertical direction of the second portion of the propeller shaft 22 by controlling the trim angle adjustment mechanism 25.

Figure 6:
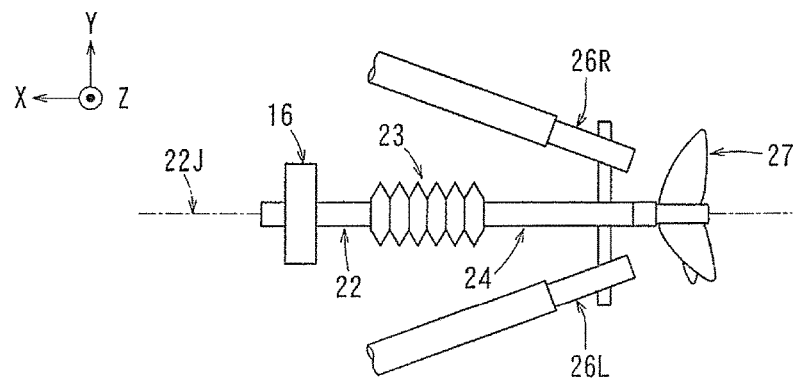
FIG. 6 is a plan view illustrating a state in which an angle in a right-left direction of the second portion of the propeller shaft is substantially zero.
Figure 7:
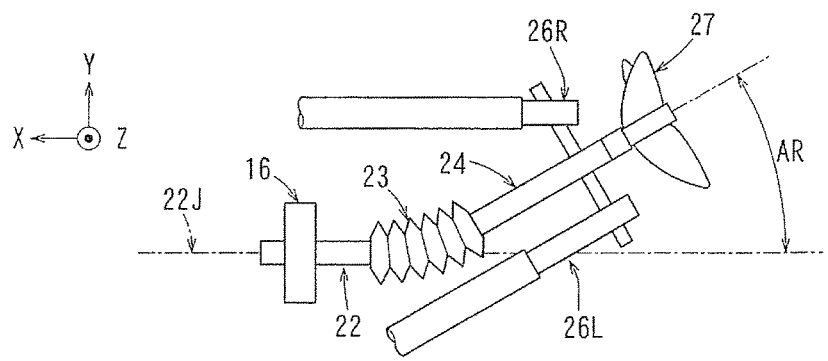
FIG. 7 is a plan view illustrating a state in which a rightward angle of the second portion of the propeller shaft in the y-direction, relative to the longitudinal axis of the boat reaches AR.
Figure 8:
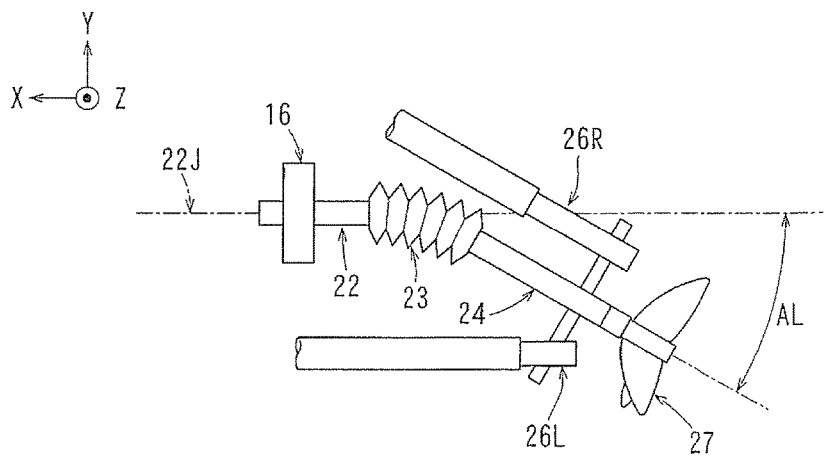
FIG. 8 is a plan view illustrating a state in which a leftward angle of the second portion of the propeller shaft opposite the y-direction, relative to the longitudinal axis of the boat reaches AL.

As shown in FIGS. 6 to 8, the steering adjustment mechanisms 26R and 26L are adjusted in length by being controlled by the controller 40. As a result, as shown in FIG. 6, the propeller shaft 22 can be set to a position where it is substantially parallel to the X-axis direction and thus substantially parallel to the front-rear direction of the boat. Further, as shown in FIG. 7, the second portion of the propeller shaft 22 can be inclined to extend to the right along the Y-axis, relative to the longitudinal axis of the boat or X-axis from the universal joint 23 by appropriate shortening of the steering adjustment mechanism 26R and lengthening of the steering adjustment mechanism 26L. As a result, the second portion of the propeller shaft 22 is inclined to the right at an angle AR with respect to the front-rear direction of the boat. As shown in FIG. 8, the second portion of the propeller shaft 22 can also be inclined to extend to the left along the Y-axis, relative to the longitudinal axis of the boat parallel or X-axis from the universal joint 23 by appropriate lengthening of the steering adjustment mechanism 26R and shortening of the steering adjustment mechanism 26L. As a result, the second portion of the propeller shaft 22 is inclined to the left at an angle AL with respect to the front-rear direction of the boat. In this way, the controller 40 can adjust the angle in the right-left direction of the second portion of the propeller shaft 22 by controlling the steering adjustment mechanisms 26R and 26L.

As shown in FIG. 9, signals are input to the controller 40 from various detection means, provided in a boat including, inter alia, front-rear inclination detecting means 51, a boat speed detecting means 52, a throttle lever angle detecting means 53, a steering detecting means 54, and the engine 11. Conversely, controller 40 outputs control signals to the trim actuator 25A driving the trim angle adjustment mechanism 25, a steering actuator 26A driving the steering adjustment mechanisms 26R and 26L, a lift actuator 31A driving the lift position adjustment mechanism 31 (See FIG. 1) (height adjustment mechanism), and various actuators for the engine 11, etc.

The boat front-rear inclination detecting means 51 is provided, for example, substantially at the center of the boat 1. The boat front-rear inclination detecting means 51 outputs to the controller 40 a signal (inclination detection signal) according to the inclination angle upward or downward in along the vertical Z-axis direction relative to the X-axis. The boat front-rear inclination detecting means 51 may be inclination sensor, an acceleration sensor or the like.

The boat speed detecting means 52 is provided at some position on the boat 1 or at some position on the boat engine propelling apparatus 10. The boat speed detecting means 52 may be, for example, a Pitot tube or a speed sensor, and outputs to the controller 40 a signal (speed detection signal) according to the speed of the boat 1.

The throttle lever angle detecting means 53 outputs to the controller 40 a signal (throttle opening detection signal) according to the angle of the throttle lever. The throttle lever angle detecting means 53 may be, for example, an angle sensor. When the user manipulates the throttle lever, the controller 40 controls the engine 11 based on the throttle opening detection signal to adjust the output of the engine 11.

The steering detecting means 54 outputs to the controller 40 a signal (steering detection signal) according to the swiveling direction or the swiveling angle of the steering wheel. The steering detecting means 54 may be, for example, a rotational angle sensor such as a potentiometer. The magnitude of the signal is varied through the manipulation of the steering wheel by the user.

The engine 11 is provided with various detecting means and detection sensors configured to detect the condition of the engine 11 and to output the detection results to the controller 40. The detecting means may be, for example, a rotation detecting means or sensor outputting a signal according to the RPM of the engine 11, a rotation detecting means or sensor outputting a rotation signal indicating the position of the top dead center of each cylinder, a temperature detecting means or sensor outputting a temperature signal indicating the temperature of the coolant used for cooling the engine 11, and/or an intake air amount detecting means or sensor outputting a detection signal according to the intake air amount. The detecting means are not restricted to the above-mentioned sensors; it is possible to employ various detecting means capable of detecting the operational condition of the engine 11.

As shown in FIG. 3, a trim actuator 25A is provided at the interface of the trim angle adjustment mechanism 25 and sleeve 24. The trim actuator 25A may be, for example, a hydraulic control valve. The trim actuator 25A adjusts the pressure within the cylinder of the trim angle adjustment mechanism 25 based on a control signal from the control 40 to thereby adjust the length of the trim angle adjustment mechanism 25.

As shown in FIG. 3, a steering actuator 26A is provided on each of the steering adjustment mechanisms 26R and 26L. Each steering actuator 26A may be, for example, a hydraulic control valve. These steering actuators 26A adjust the pressure within the cylinders of the steering adjustment mechanisms 26R and 26L based on a control signal from the controller 40 to thereby adjust the length of the steering adjustment mechanisms 26R and 26L.

A lift actuator 31A (shown in FIG. 9) is provided on the lift position adjustment mechanism 31 shown in FIG. 1. The lift actuator 31A may be, for example, a hydraulic control valve. The lift position adjustment mechanism 31 has, for example, a cylinder and a rod connected to a piston provided in the cylinder. The lift actuator 31A adjusts the pressure within the cylinder of the lift position adjustment mechanism 31 based on a control signal from the controller 40 to thereby adjust the length of the lift position adjustment mechanism 31. This manner of construction can adjust the position of the boat engine propelling apparatus 10 along the direction of the Z-axis upward/downward with respect to the position of boat 1.

The engine 11 is provided with various actuators. The actuators may be, for example, an injector that injects fuel into each cylinder of the engine 11, or an actuator for controlling a supercharger such as a turbocharger in case the supercharger is mounted. The actuator is not restricted to the above-mentioned ones but may be various means or mechanisms that control the operation of the engine 11.

Figure 10:
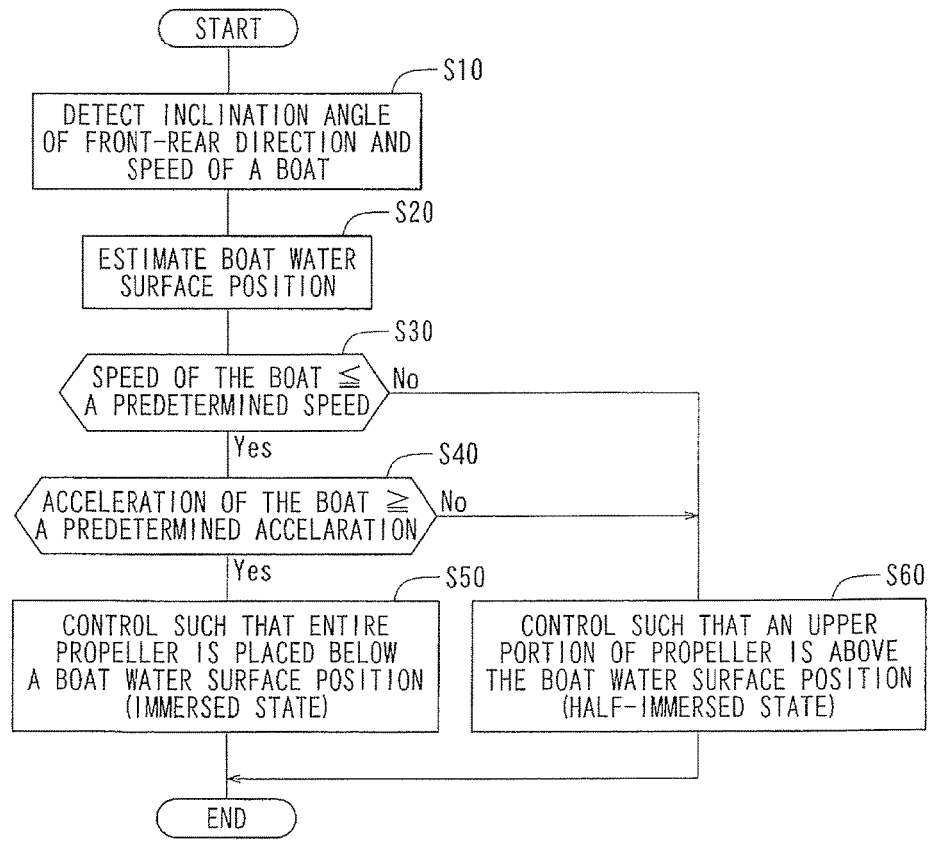
FIG. 10 is a flowchart of processing procedures for the controller to set a propeller to be in an immersed state or a half-immersed state.

The controller 40 has an algorithm for executing a flowchart shown in FIG. 10. The flowchart shown in FIG. 10 illustrates processing procedures for controlling the position of the propeller 27. The controller 40 starts the processing shown in FIG. 10 with a predetermined processing timing (at intervals, for example, of several tens of ms to several hundreds of ms).

In step S10 of FIG. 10, the controller 40 detects the inclination angle of the front-rear direction line of the boat 1 along the x-axis based on an inclination detection signal from the boat front-rear inclination detecting means 51, and detects the speed and acceleration of the boat 1 based on a speed detection signal from the boat speed detecting means 52. The procedure advances from step S10 to step S20.

In step S20, the controller 40 estimates the boat water surface position based on the inclination angle of the front-rear direction line of the boat 1, the speed of the boat 1, and the acceleration of the boat 1. The boat water surface position is the water surface position with respect to the boat, and also includes the angle of the water surface with respect to the boat. The boat water surface position varies according to the boat navigating state, such as the state in which the boat is at rest, the state in which the boat is accelerating, and the state in which the boat is cruising at high speed. Thus, it is desirable to obtain the boat water surface position according to the navigating state of the boat as appropriate. For example, the higher the speed of the boat, the lower the water surface height with respect to the boat rear portion. The greater the acceleration of the boat, the lower the water surface height with respect to the boat rear portion. The procedure advances from step S20 to step S30.

In step S30, the controller 40 determines whether or not the speed of the boat 1 is not higher than a predetermined speed. When the speed of the boat is the same or lower than the predetermined speed (YES), the procedure advances to step S40; when the speed of the boat is higher than the predetermined speed (NO), the procedure advances to step S60.

In the case where the procedure advances to step S40, the controller 40 determines whether or not the acceleration of the boat 1 is the same or higher than a predetermined acceleration. When the acceleration of the boat 1 is the same or greater than a predetermined acceleration (YES), the procedure advances to step S50; when the acceleration of the boat is less than the predetermined acceleration (NO), the procedure advances to step S60.

In the case where the procedure advances to step S50, the controller 40 determines that the position of the propeller 27 is to be controlled so as to be in an immersed state. In this case, the controller 40 controls the trim angle adjustment mechanism 25 (height adjustment mechanism) such that the entire propeller 27 is placed in the immersed state in which it is below the boat water surface position to complete the processing. That is, the height of the propeller 27 is adjusted such that during the rotation of the propeller 27, the distal end of the propeller 27 is always situated below the boat water surface position estimated in step S20.

In the case where the procedure advances to step S60, the controller 40 determines that the position of the propeller 27 is to be controlled so as to be in the half-immersed state. In this case, the controller 40 controls the trim angle adjustment mechanism 25 such that the propeller 27 is placed in the half-immersed state in which the upper portion of the propeller 27 is above the boat water surface position and in which the lower portion of the propeller 27 is below the boat water surface position before completing the processing. For example, the height of the propeller 27 is adjusted such that the difference in height between the boat water surface position estimated in step S20 and the height of the rotation center of the propeller 27 is less than the radius of the propeller 27.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. Embodiments of the present invention should not be limited to the representative configurations, but may be modified, for example, as described below.

In the flowchart of FIG. 10, the controller 40 estimates the boat water surface position based on the speed and acceleration of the boat and the inclination angle of the front-rear direction line. Alternatively, the controller 40 may estimate the boat water surface position based on at least one of the speed and acceleration of the boat, and on the inclination angle of the front-rear direction line. In the flowchart of FIG. 10, the controller 40 determines whether to place the propeller 27 in the immersed state or the half-immersed state based on both of the speed and acceleration of the boat. Alternatively, the controller 40 may determine whether to place the propeller 27 in the immersed state or the half-immersed state based on at least one of the speed and acceleration of the boat.

In steps S50 and S60 of FIG. 10, the trim angle adjustment mechanism 25 is controlled so as to place the propeller 27 in the immersed state or the half-immersed state. Instead thereof, or in addition thereto, the lift position adjustment mechanism 31 may be controlled to place the propeller 27 in the immersed state or the half-immersed state. That is, the propeller 27 may be placed in the immersed state or the half-immersed state by controlling the height adjustment mechanism of at least one of the trim angle adjustment mechanism 25 and the lift position adjustment mechanism 31.

As described above, when the user requires acceleration, the controller 40 attaches more importance to acceleration property than to fuel efficiency, and performs control so as to place the propeller 27 in the immersed state. During high speed cruising, the controller 40 attaches more importance to fuel efficiency than to acceleration property, and performs control so as to place the propeller 27 in the half-immersed state. The position of the propeller 27 with respect to the boat water surface position can be adjusted by using the trim angle adjustment mechanism 25 or the lift position adjustment mechanism 31. Thus, there is no need to provide a variety of separate boat engine propelling apparatuses which differ in the height as measured from the mounting position at the boat rear end to the propeller 27 according to the height of the boat rear end as measured from the water surface. As a result, with an integrated solution it is possible to reduce the time and effort for production or the management work for variation.

The position of the propeller 27 with respect to the boat water surface position can be adjusted by the trim angle adjustment mechanism 25. Thus, it is possible to omit the lift position adjustment mechanism 31. There are cases, however, where it is desirable to provide the lift position adjustment mechanism 31. For example, there is a case where the boat is brought to land for the purpose of maintenance and where the mechanic or others wish to adjust to engine propelling apparatus to a desired height where a lift position adjustment mechanism may offer increased ease of use.

Figure 11:
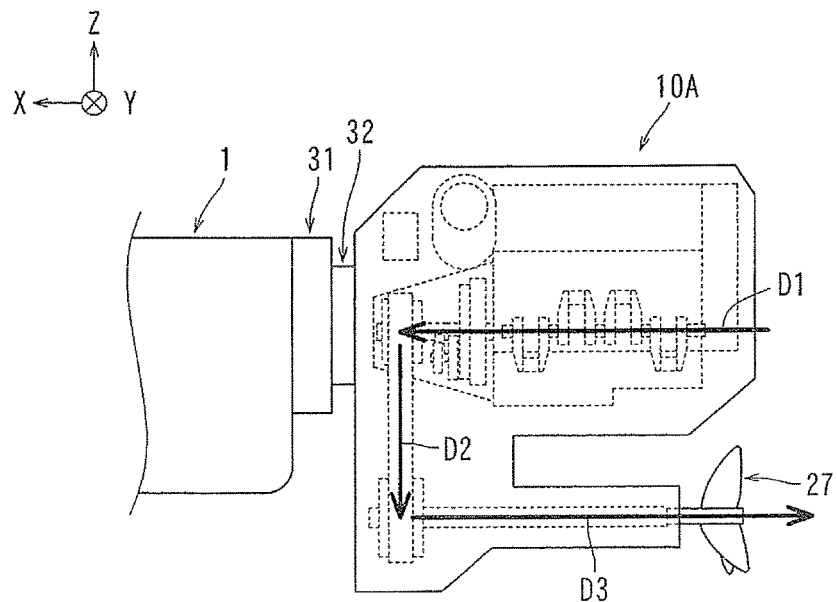
FIG. 11 is a side view illustrating an appearance and general constitution of a marine engine propelling apparatus according to another embodiment.
Figure 12:
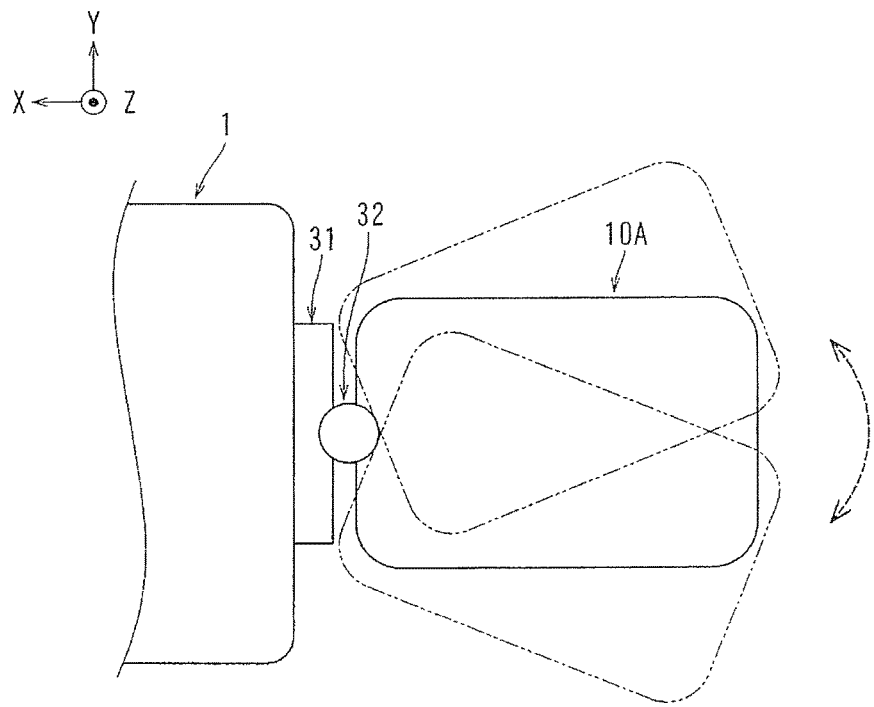
FIG. 12 is a plan view of the marine engine propelling apparatus of FIG. 11 as the boat turns to right or left relative to the longitudinal axis of the boat.

Instead of the engine propelling apparatus 10 shown in FIG. 2, an engine propelling apparatus 10A as shown in FIGS. 11 and 12 may be employed. The engine propelling apparatus 10A does not have the universal joint 23, the trim angle adjustment mechanism 25, and the steering adjustment mechanisms 26R and 26L shown in FIG. 3 but instead has a right-left angle adjustment mechanism (means) 32 shown in FIGS. 11 and 12 for manipulation of the apparatus along the y-axis. Otherwise, the engine propelling apparatus 10A is of the same construction as the engine propelling apparatus 10.

As shown in FIGS. 11 and 12, the right-left angle adjustment mechanism 32 is provided between the lift position adjustment mechanism 31 and the boat engine propelling apparatus 10A, or between the boat 1 and the lift position adjustment mechanism 31 (not shown). The right-left angle adjustment mechanism 32 has, for example, a cylinder, and a rod connected to a piston provided within the cylinder. Alternatively, it comprises a gear to be rotated by a motor. When the controller 40 detects the manipulation of the steering wheel by the user, the controller 40 can then control the right-left angle adjustment mechanism 32 according to the swiveling direction and the swiveling angle of the steering wheel. The right-left angle adjustment mechanism 32 adjusts the hydraulic pressure of the cylinder, or drives the motor, thereby adjusting the right-left direction angle of the engine propelling apparatus 10A with respect to the boat 1.

In the engine propelling apparatus 10A of FIGS. 11 and 12, the controller 40 controls the lift position adjustment mechanism 31 in step S50 of FIG. 10 so as to place the propeller 27 in the immersed state. In step S60, the controller 40 controls the lift position adjustment mechanism 31 so as to place the propeller 27 in the half-immersed state.

As compared with the engine propelling apparatus 10 of FIG. 2, in the engine propelling apparatus 10A of FIGS. 11 and 12, the right-left angle adjustment mechanism 32 is an added component, whereas the universal joint 23, the trim angle adjustment mechanism 25, and the steering adjustment mechanisms 26R and 26L are omitted. Thus, the engine propelling apparatus 10A is of a simpler structure as compared with the engine propelling apparatus 10, and comprises a smaller number of components. As a result, the engine propelling apparatus 10A can be formed in a more lightweight manner and can be smaller compared to the engine propelling apparatus 10.

The embodiments of FIGS. 11 and 12 may also be provided with an engine trim adjustment mechanism (means) for adjusting the angle in the vertical direction of the engine propelling apparatus 10A with respect to the boat 1. The engine trim adjustment mechanism has, for example, a gear to be rotated by a motor, and changes the angle of the engine propelling apparatus 10A around the mounting position with respect to the boat 1. As a result, the height of the rear portion of the engine propelling apparatus 10A can be adjusted. Thus, a mechanic et al. can adjust the engine propelling apparatus to a desired angle when the boat is brought to land for the purpose of maintenance or the like.

Figure 13:
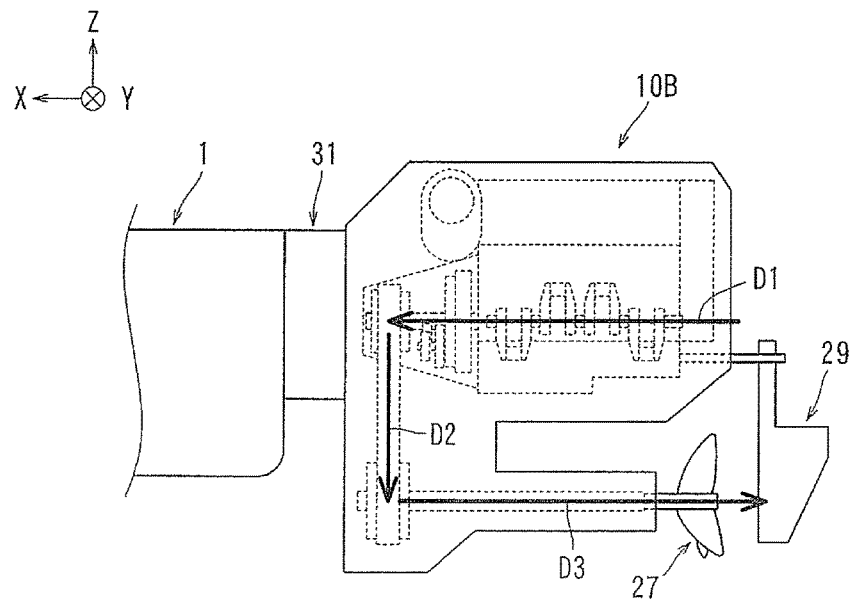
FIG. 13 is a side view illustrating an appearance and general constitution of a marine engine propelling apparatus according to another embodiment.
Figure 14:
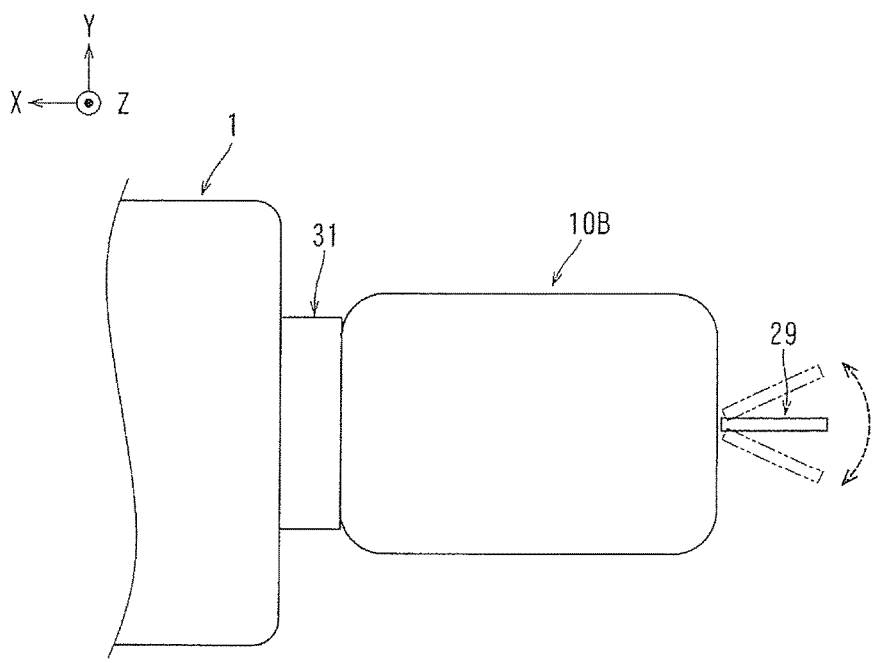
FIG. 14 is a plan view of the marine engine propelling apparatus of FIG. 13 as the boat turns to right or left relative to the longitudinal axis of the boat.
Figure 15:
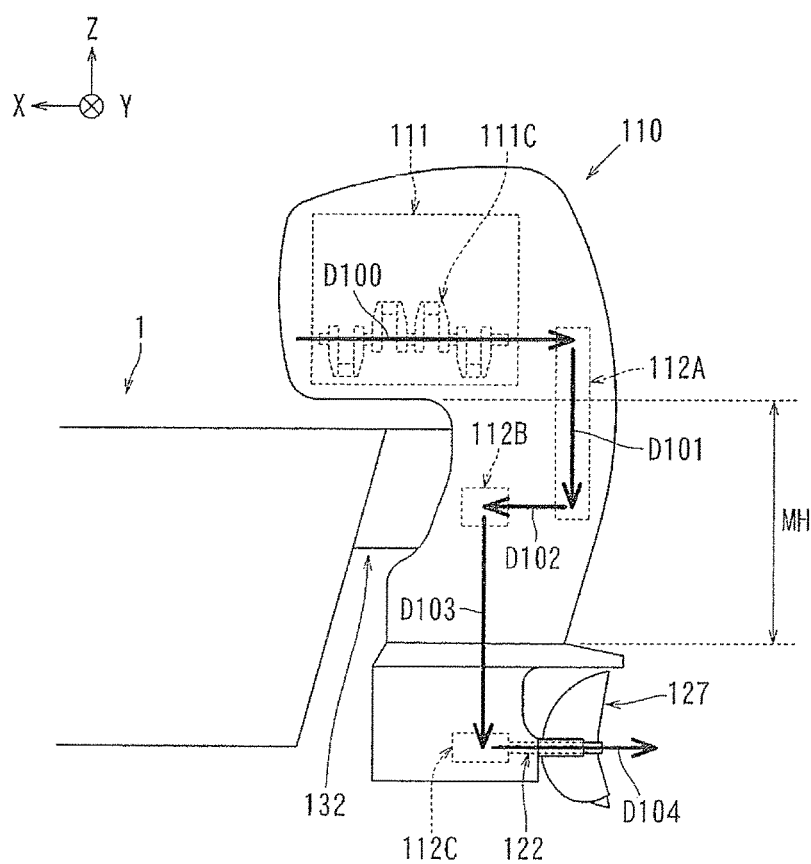
FIG. 15 is a side view illustrating an appearance, general constitution and power transmitting route of a conventional marine engine propelling apparatus.

Instead of the engine propelling apparatus 10A shown in FIGS. 11 and 12, an engine propelling apparatus 10B as shown in FIGS. 13 and 14 may be employed. The engine propelling apparatus 10B does not have the right-left angle adjustment mechanism 32 of FIGS. 11 and 12, but has a steering rudder 29 as shown in FIGS. 13 and 14. Otherwise, the engine propelling apparatus 10B is of the same construction as the engine propelling apparatus 10A.

As shown in FIGS. 13 and 14, the steering rudder 29 is arranged on the engine propelling apparatus 10B and at the rear of the propeller 27. The steering rudder 29 is a plate, and is mounted to the main body of the engine propelling apparatus 10B so as to allow changing of the angle of the apparatus in the right-left direction. When the controller 40 detects the manipulation of the steering wheel by the user, the controller 40 controls the angle in the right-left direction of the steering rudder 29 according to the swiveling direction and the swiveling angle of the steering wheel manipulation.

In the engine propelling apparatus 10B of FIGS. 13 and 14, the controller 40 controls the lift position adjustment mechanism 31 in step S50 of FIG. 10 so as to place the propeller 27 in the immersed state. In step S60, the controller 40 controls the lift position adjustment mechanism 31 so as to place the propeller 27 in the half-immersed state.

As compared with the engine propelling apparatus 10 of FIG. 2, in the engine propelling apparatus 10B of FIGS. 13 and 14, the steering rudder 29 is an added component, whereas the universal joint 23, the trim angle adjustment mechanism 25, and the steering adjustment mechanisms 26 and 27 are omitted. Thus, the engine propelling apparatus 10B is of a simpler structure than the engine propelling apparatus 10, and comprises a lesser number of components.

As a result, the engine propelling apparatus 10B can be formed in a more lightweight manner and can be made smaller as compared with the engine propelling apparatus 10.

The construction of FIGS. 13 and 14 may be provided with an engine trim adjustment mechanism (means) for adjusting the angle in the vertical direction of the engine propelling apparatus 10B upward/downward along the Z-axis with respect to the boat 1.

In the above description, the expressions such as "not less than" (≥), "not more than" (≤), "more than" (>), and "less than" (<) may be construed as including or not including an equal sign.

As described above, an engine obtained through a minor change of a diesel engine for land use may be employed as the engine 11. Alternatively, an engine obtained through a minor change of a gasoline engine for land use may be employed as the engine 11.

As described above, the power transmitting portion 17 has the pulleys 14 and 16, and the belt 15. Alternatively, the power transmitting portion 17 may have a plurality of gears, or a gear and a shaft, or a gear and chain, etc. so as to form a linear power transmission route D2.

As described above, the lift position adjustment mechanism 31, the steering adjustment mechanisms 26R and 26L, etc. are controlled by the controller 40. Alternatively, the lift position adjustment mechanism 31, etc. may be controlled by a lever or the like operated manually by the user. As described above, the trim angle adjustment mechanism 25 and the steering adjustment mechanisms 26R and 26L may be of a construction such that they expand and contract hydraulically. Alternatively, they may comprise other types of mechanisms.

The invention claimed is:

1. A marine engine propelling apparatus, which is configured to be mounted to an outboard portion at a rear end of a boat, comprising:
    a power generating portion;
    a power transmitting portion;
    a propelling force generating portion; and
    a height adjustment mechanism,
    wherein the power generating portion comprises an engine equipped with a crankshaft, and the crankshaft is configured to be arranged substantially parallel to a front-rear direction of the boat, along its longitudinal axis, and is substantially horizontal,
    wherein the power transmitting portion includes a power transmission mechanism forming a linear power transmission route extending from the vicinity of a front end of the crankshaft to the vicinity of a front end of the propelling force generating portion,
wherein the propelling force generating portion includes a propeller shaft extending rearwards relative to the boat from the power transmitting portion, and a propeller provided at a rear portion of the propeller shaft,
    wherein the propeller shaft includes:
    a first portion that is configured to extend rearwards relative to the boat along an X-axis from the power transmitting portion so as to be substantially parallel to the front-rear direction of the boat and extending substantially horizontally; and
    a second portion connected to a rear end of the first portion by a universal joint so as to allow for an angle adjustment of the propeller shaft,
    wherein the height adjustment mechanism is configured to vary inclination or height of all or a part of the engine propelling apparatus with respect to the boat to thereby vary height of the propeller with respect to the boat,
    wherein the marine engine propelling apparatus further comprises:
    a boat speed detector for detecting a speed of the boat;
    a boat front-rear inclination detector for detecting an inclination angle of a front-rear direction line of the boat with respect to a horizon; and
    a controller,
    wherein the controller is configured to estimate a boat water surface position, which is a position of a water surface with respect to the boat based on at least one of the speed or an acceleration of the boat detected based on a detection signal from the boat speed detector, and the inclination angle of the boat front-rear direction line detected based on a detection signal from the boat front-rear inclination detector,
    wherein the controller is configured to determine whether to attain an immersed state in which a whole of the propeller is below the estimated boat water surface position or to attain a half-immersed state in which an upper portion of the propeller is above the estimated boat water surface position based on at least one of the speed or the acceleration of the boat detected,
    wherein in a case where the controller determines that the immersed state is to be attained, the controller controls the height adjustment mechanism such that the whole propeller is below the estimated boat water surface position, and
    wherein in a case where the controller determines that the half-immersed state is to be attained, the controller controls the height adjustment mechanism such that the upper portion of the propeller is above the estimated boat water surface position.

2. The marine engine propelling apparatus of claim 1, wherein
    the propelling force generating portion includes a sleeve into which at least a part of the second portion is inserted.

3. The marine engine propelling apparatus of claim 2, wherein
    the height adjustment mechanism is a trim angle adjustment mechanism connected to the sleeve and configured to change an angle of the second portion with the sleeve upward/downward along a Z-axis about the universal joint.

4. The marine engine propelling apparatus of claim 2, further comprising:
    a steering adjustment mechanism connected to the sleeve and configured to change an angle in a right-left direction of the second portion along with the sleeve parallel to a Y-axis, about the universal joint.

5. The marine engine propelling apparatus of claim 1, wherein
    a power transmission route from the power generating portion to the propeller is formed in a substantially laterally facing U-shaped configuration by the crankshaft, the power transmission mechanism, and the propeller shaft.

6. The marine engine propelling apparatus of claim 1, wherein
    the height adjustment mechanism is a lift position adjustment mechanism configured to be provided between the boat and the power generating portion and configured to adjust height of the engine propelling apparatus with respect to the boat.

7. The marine engine propelling apparatus of claim 6, further comprising:
a right-left angle adjustment mechanism configured to change an angle in a right-left direction of the engine propelling apparatus parallel to a Y-axis with respect to the boat, where the right-left angle adjustment mechanism is provided between the boat and the power generating portion.

8. The marine engine propelling apparatus of claim 6, further comprising:
a steering rudder with a plate-shape arranged at a rear of the propeller so as to allow a changing of the angle in the right-left direction of the engine propelling apparatus parallel to the Y-axis.

9. The marine engine propelling apparatus of claim 6, further comprising:
an engine trim adjustment mechanism configured to be provided between the power generating portion and the boat, and configured to adjust an inclination angle in a vertical direction of a front-rear direction line of the engine propelling apparatus with respect to the boat.

10. The marine engine propelling apparatus of claim 1, further comprising:
a cooling mechanism equipped with a cooling route, and a coolant sealed in the cooling route, configured to cool the engine propelling apparatus through circulation of the coolant.

11. The marine engine propelling apparatus of claim 1 wherein the engine is a diesel engine.

12. A marine engine propelling apparatus, which is configured to be mounted to an outboard portion at a rear end of a boat, comprising:
a power generating portion;
a power transmitting portion provided below the power generating portion;
a propelling force generating portion provided adjacent to the power transmitting portion; and
a height adjustment mechanism,
wherein the power generating portion comprises an engine equipped with a crankshaft, and the crankshaft is configured to be arranged parallel to an X-axis and a front-rear direction of the boat, and is substantially horizontal relative to said axis,
wherein the power transmitting portion includes a power transmission mechanism comprising a belt and a plurality of pulleys in driving engagement with said crankshaft, forming a linear power transmission route extending opposite to a Z-direction parallel to a Z-axis from the vicinity of a front end of the crankshaft to the vicinity of a front end of the propelling force generating portion,
wherein the propelling force generating portion comprises a propeller shaft extending rearwards opposite an X-direction of the X-axis from the power transmitting portion and a propeller provided at a rear portion of the propeller shaft,
wherein the height adjustment mechanism comprises a cylinder and a bar connecting said propeller shaft, such that the height adjustment mechanism is configured to change an angle of the propeller shaft upward/downward to thereby vary an inclination and a height of the propeller with respect to the boat,
wherein the marine engine propelling apparatus further comprises:
a boat speed detector for detecting a speed of the boat comprising a speed sensor,
a boat front-rear inclination detector for detecting an inclination angle of a front-rear direction line of the boat with respect to a horizon comprising one of an inclination sensor or an acceleration sensor, and
a controller,
wherein the controller is configured to estimate a boat water surface position, which is a position of a water surface with respect to the boat based on at least one of the speed or an acceleration of the boat detected based on a detection signal from the boat speed detector, and the inclination angle of the boat front-rear direction line detected based on a detection signal from the boat front-rear inclination detector,
wherein the controller is configured to determine whether to attain an immersed state in which a whole of the propeller is below the estimated boat water surface position or to attain a half-immersed state in which an upper portion of the propeller is above the estimated boat water surface position based on at least one of the speed or acceleration of the boat detected,
wherein in a case where the controller determines that the immersed state is to be attained, the controller controls the height adjustment mechanism through an actuator such that the whole propeller is submerged below the estimated boat water surface position, and
wherein in a case where the controller determines that the half-immersed state is to be attained, the controller controls the height adjustment mechanism through the actuator such that the upper portion of the propeller is above the estimated boat water surface position.

13. The marine engine propelling apparatus of claim 12, wherein
the propeller shaft includes:
a first portion extending rearwards from the power transmitting portion parallel to the front-rear direction of the boat extending substantially horizontally,
a second portion connected to and extending from a rear end of the first portion via a universal joint which allows an angle adjustment of the propeller shaft,
the propeller is provided at a rear portion of the second end of the propeller shaft,
the propelling force generating portion further comprises a sleeve into which at least a part of the second portion is inserted, and
the height adjustment mechanism comprises the cylinder and the bar connecting said sleeve with a piston in said cylinder such that the height adjustment mechanism is configured to change an angle of the second portion with the sleeve upward/downward along the Z-axis about the universal joint to thereby vary the inclination and the height of the propeller with respect to the boat.

14. The marine engine propelling apparatus of claim 1, wherein
the estimated boat water surface position varies according to a boat navigating state, and
when the boat navigating state is determined to be in one of a boat-accelerating state or a boat-cruising state, a height of the water surface with respect to the boat is lower than when the boat navigating state is determined to be in a boat-rest state.

15. The marine engine propelling apparatus of claim 1, wherein
the estimated boat water surface position further includes an angle of the water surface with respect to the boat.

16. The marine engine propelling apparatus of claim 12, wherein
the estimated boat water surface position varies according to a boat navigating state, and
when the boat navigating state is determined to be in one of a boat-accelerating state or a boat-cruising state, a height of the water surface with respect to the boat is lower than when the boat navigating state is determined to be in a boat-rest state.

17. The marine engine propelling apparatus of claim 12, wherein
the estimated boat water surface position further includes an angle of the water surface with respect to the boat.

* * * * *